United States Patent [19]

Howard et al.

[11] Patent Number: 5,359,414
[45] Date of Patent: Oct. 25, 1994

[54] RING LASER GYROSCOPE FRINGE DETECTOR APPARATUS WITH RADIATION PHOTOCURRENT COMPENSATION

[75] Inventors: Timothy L. Howard, Placentia; Charles W. Kohlenberger, Fullerton, both of Calif.

[73] Assignee: Rockwell International Corporation, Seal Beach, Calif.

[21] Appl. No.: 947,257

[22] Filed: Dec. 29, 1986

[51] Int. Cl.$^5$ .............................................. G01C 19/64
[52] U.S. Cl. .................................................... 356/350
[58] Field of Search ..................... 356/350; 250/214 C, 250/214 B

[56] References Cited

U.S. PATENT DOCUMENTS

| | | | |
|---|---|---|---|
| 4,219,276 | 8/1980 | Dorsman | 356/350 |
| 4,514,087 | 4/1985 | Vescial | 356/350 |
| 4,514,832 | 4/1985 | Vescial | 356/350 |
| 4,566,794 | 1/1986 | Hanse | 356/350 |
| 4,595,293 | 6/1986 | Geen | 356/350 |
| 4,606,637 | 8/1986 | Geen | 356/350 |
| 4,628,515 | 12/1986 | Rodloff et al. | 356/350 X |
| 4,664,523 | 5/1987 | Dorsman | 356/350 |
| 4,676,643 | 6/1987 | Vescial | 356/350 |

*Primary Examiner*—Mark Hellner
*Attorney, Agent, or Firm*—H. Fredrick Hamann; George A. Montanye; Tom Streeter

[57] ABSTRACT

A ring laser gyroscope radiation-resistant detector lens system for mounting on a ring laser gyroscope body having a resonant cavity. The ring laser gyroscope body has CW and CCW counterpropagating light beams propagating in a plane normal to the rate input axis of the ring laser gyroscope. The ring laser gyroscope detector lens system comprises a means for extracting a component of each of the CW and a CCW light beams from the cavity and for combining the extracted CW and CCW beams to form a substantially circular interference light source. A planar array of detector element receives light from an objective lens means responsive to the interference light source. The objective lens means is a cylindrical lens that forms an elliptically-shaped interference light source pattern on a first and second adjacent pair of detectors in an array of four detector elements. A bias and amplification means is provided for conditioning each of the detectors in the array to be independently responsive to incident light intensity and to recurrent-transient gamma-radiation. The amplification means is further characterized to provide a detector output signal for each of said first and second detector elements in response to the incident light intensity penetrating a predetermined threshold. The phase relationship between the detector output signals and the repetition rate of the detector output signals characterize the rotational polarity and rotational rate of the ring laser gyroscope body on the input axis. The third and fourth detector elements are positioned to produce photo-currents to cancel the photo currents produced by said first and second detector elements in response to the recurrent transient gamma-radiation.

13 Claims, 6 Drawing Sheets

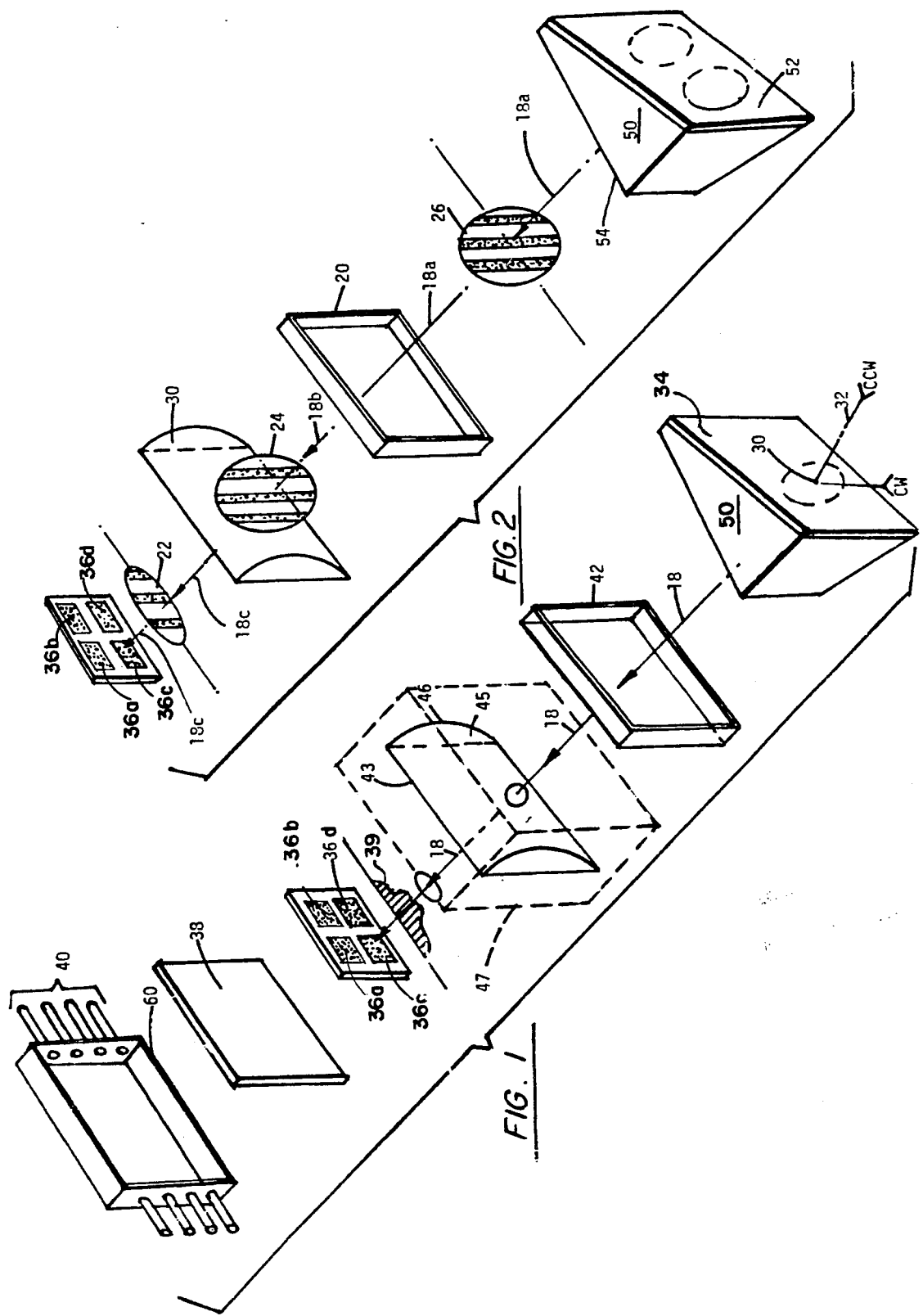

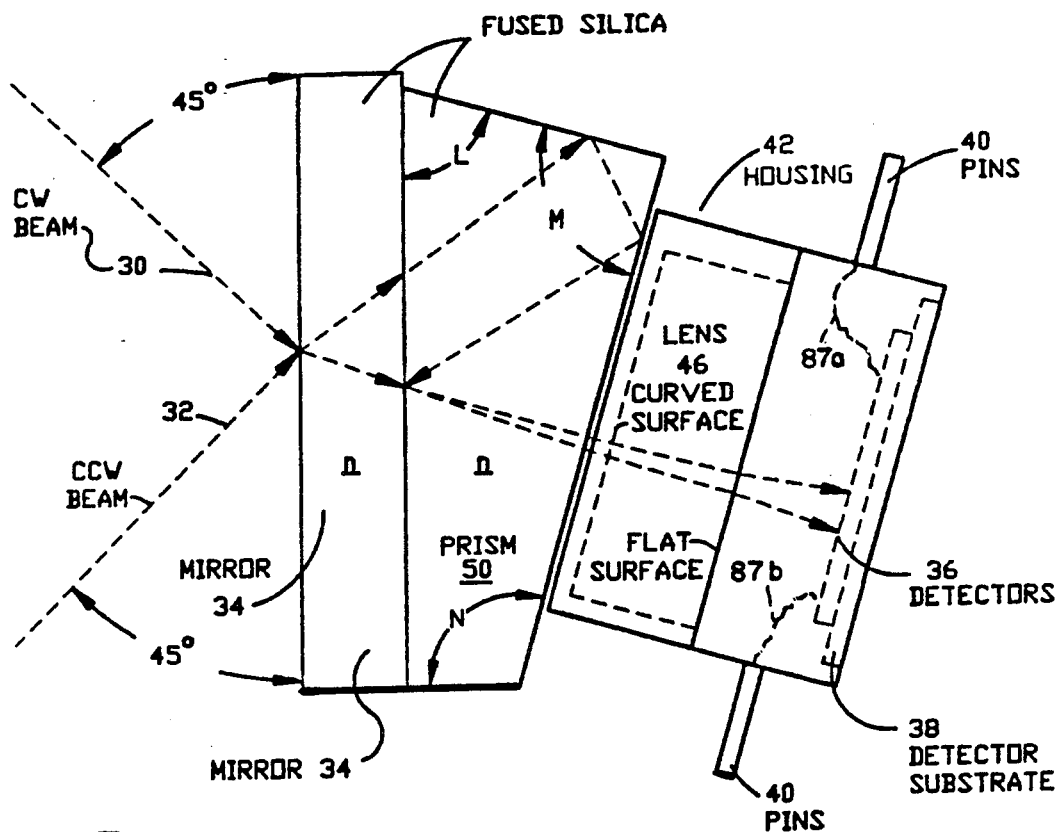
FIG. 7
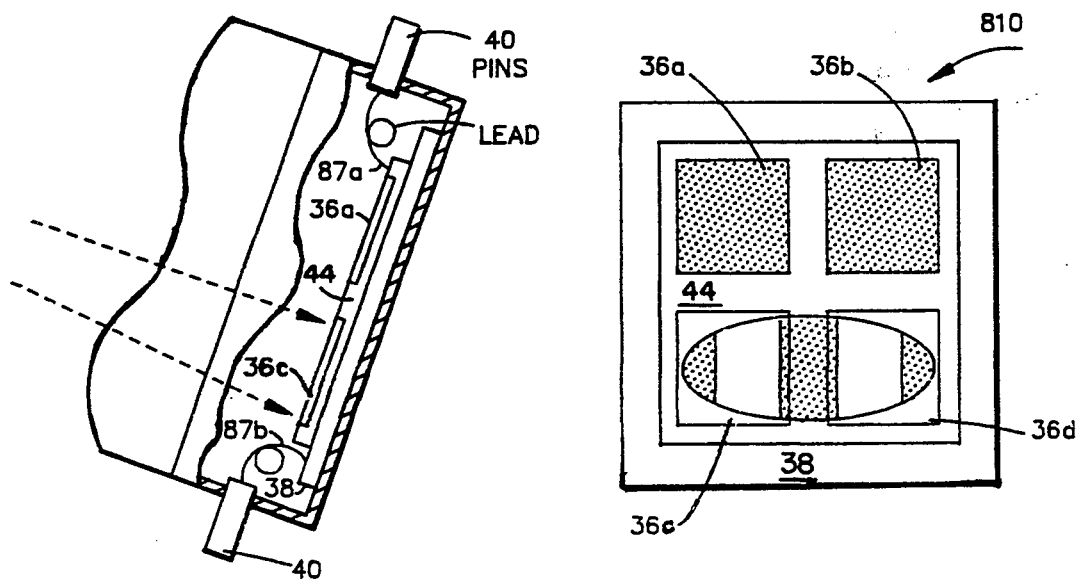
FIG. 7a
FIG. 8

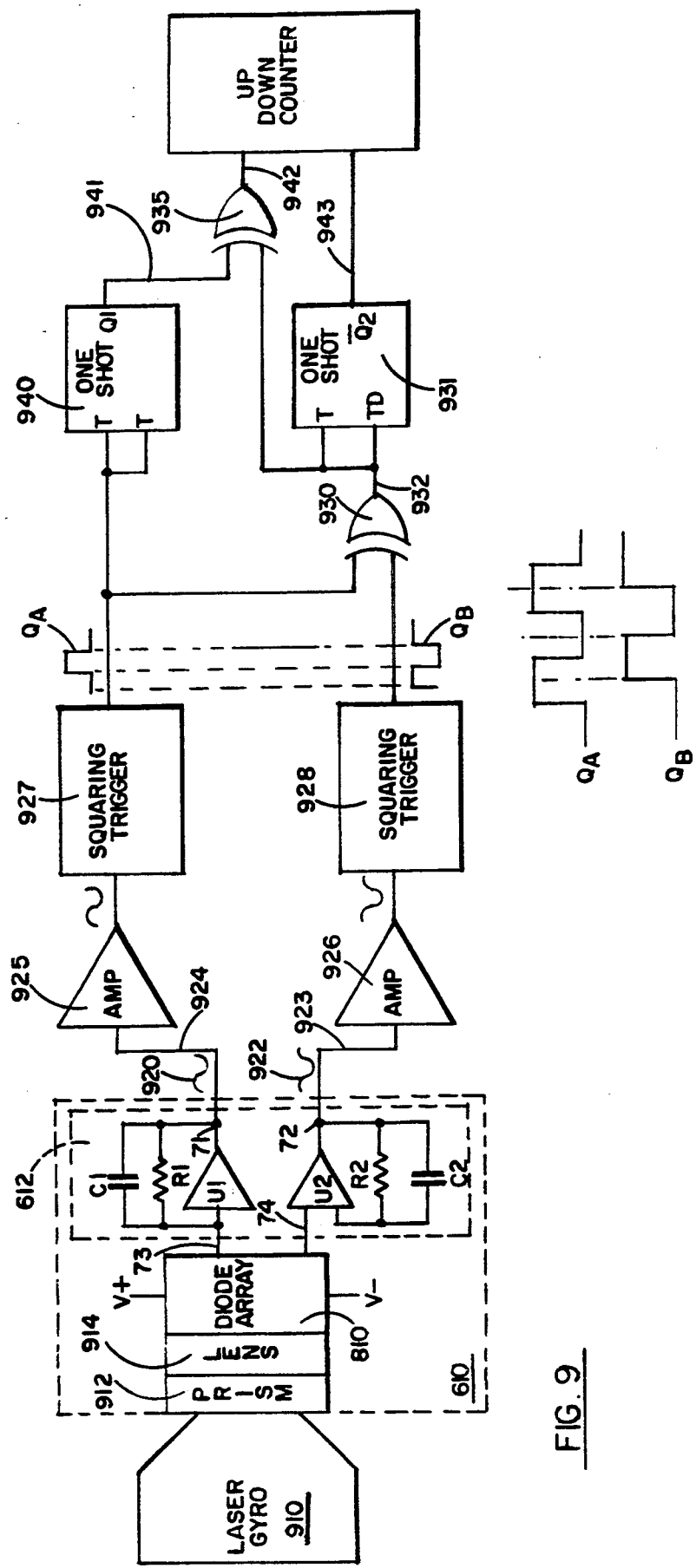

RING LASER GYROSCOPE FRINGE DETECTOR APPARATUS WITH RADIATION PHOTOCURRENT COMPENSATION

BACKGROUND OF THE INVENTION

1. Field of the Invention

This invention relates to the field of inertial guidance and more particularly to the field of ring laser gyroscopes and to the field of detector systems used by ring laser gyroscopes to detect rotational information from counterpropagating light beams.

2. Description of Prior Art

U.S. patent application having a filing date of Dec. 21, 1984, Ser. No. 686,336, entitled "Ring Laser Gyro Detector Lens System", and having common assignee.

U.S. patent application having a filing date of Oct. 4, 1985, Ser. No. 783,997, entitled "Ring Laser Gyro Readout Assembly with Adjustment Capability" and U.S. Pat. No. 4,514,087 issued Apr. 30, 1985, entitled "Ring Laser Gyro Readout for Partially Overlapped Beams" and U.S. Pat. No. 4,514,832 issued Apr. 30, 1985, entitled "Single Mirror Ring Laser Gyro Readout without Combining Optics", all having a common assignee are related to this application.

Detector systems used in ring laser gyroscope applications typically employ at least one partially transmissive mirror at locations in a resonant cavity through which components of a CW and a CCW beam are extracted. The beams are then combined using combining optics such as a prism. The combined beams are then directed onto a focal plane to form an illuminated spot in which interference patterns are characterized as areas of high and low intensity. As an ring laser gyroscope experiences an input body rate, the interference patterns move across the illuminated spot in response to the SAGNAC effect. Conventional ring laser gyroscope detector systems position an array of two or three PIN diode detectors in the illuminated spot on the focal plane. The diode detectors being positioned and biased to sense and provide electrical signals in response to movement of the interference pattern across their surface. The electrical signals thus provided are amplified and conditioned to provide digital body rate information.

A conventional ring laser gyroscope detector system will typically have an illuminated spot size of greater than 0.030 inches and will use diodes of 0.030 inches on an edge, and separated by 0.005 inches.

The diodes used are typically semicircular or rectangular in shape. The size of the diode, the depth of the diffusion, the peak intensity of the illuminated spot and the separation of the interference patterns each combine to influence the detector system's signal to noise ratios and bandwidth.

SUMMARY OF THE INVENTION

It is a major objective of this invention to provide a ring laser gyroscope detector lens system that allows the size of a typical semiconductor detector to be reduced in total area by more than fifty percent without experiencing a commensurate reduction in signal to noise ratio. The reduced size of the detectors used typically contributes to reduced signal-to-noise ratio.

It is a further objective of this invention to simplify the design of the detectors used, and to enable the use of conventionally shaped detectors.

It is another objective of this invention to provide a detector lens system having substantially higher immunity to gamma radiation resulting from the reduced size of the detectors and from the use of a pair of non-illuminated detectors used to produce compensation photo-currents to cancel the gamma-radiation-induced photo-currents source by the illuminated diodes.

It is another objective of this invention to provide detector biasing and amplification to compensate for gamma-radiation-induced photocurrents.

BRIEF DESCRIPTION OF THE DRAWINGS

FIG. 1 is an exploded perspective view of the invention detector system showing the relative intensity of light on this detector.

FIG. 2 is an exploded perspective view of the invention detector system showing a representation of typical interference patterns on three intermediate image planes.

FIG. 7 is a stop plan view of the assembled ring laser gyroscope detector lens system showing a ray trace from the CW and CCW beams through to the detectors.

FIG. 7a is a side sectional view of the detector array housing of FIG. 7 showing a side view of the detector array.

FIG. 8 is a face-on view of the detector array showing the substantially elliptical interference light source pattern properly positioned on the array.

FIG. 9 is a block diagram showing the detector and preamplifier circuit of FIG. 6 in relationship to a complete laser gyro readout electronics system.

FIG. 9a shows the output of the squaring trigger circuit.

DESCRIPTION OF THE PREFERRED EMBODIMENT

Figure 3:
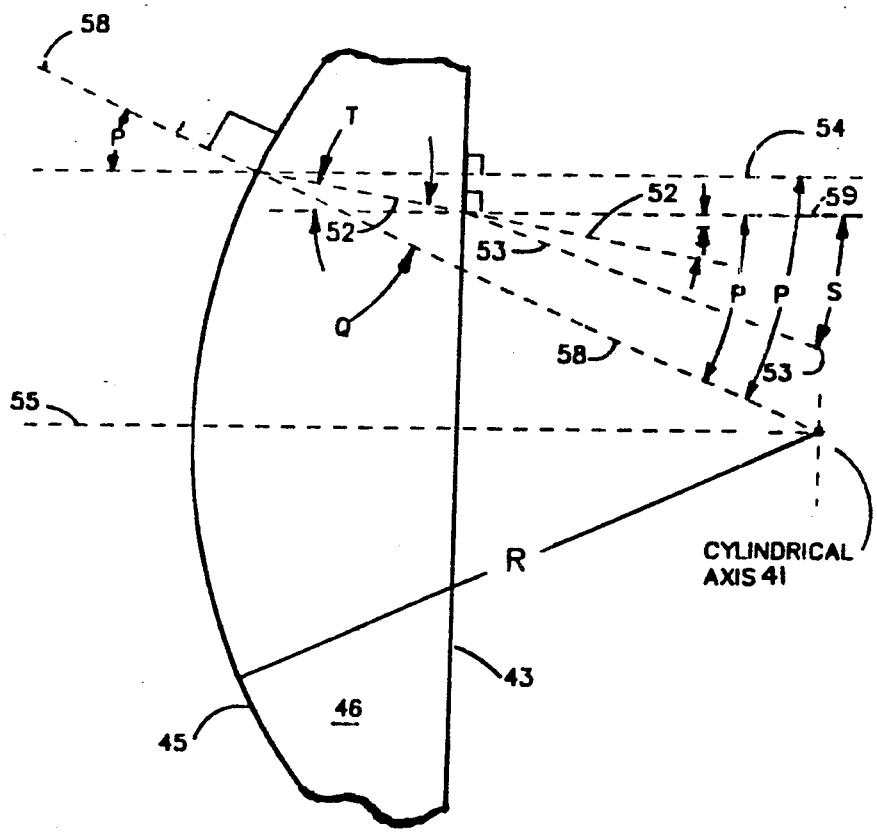
FIG. 3 is a typical ray tracing through a cylindrical lens shown in section.

FIG. 1 shows the invention ring laser gyroscope detector lens system 10 for mounting on an ring laser gyroscope body (not shown). A typical ring laser gyroscope has a resonant cavity in which CW 30 and CCW 32 counterpropagating light beams propagate in a plane normal to the rate input axis of the ring laser gyroscope. The ring laser gyroscope detector lens system 10 of FIG. 1 is comprised of the following elements. Mirror 34 represents a means for extracting a component of the CW and a component of the CCW light beams from the cavity to provide extracted CW and CCW beams. Prism 50 represents a means for combining the extracted CW and CCW beams to form a substantially circular interference light source 12 shown exiting the PRISM in FIG. 5 as a pair of rays. FIGS. 1 and 2 show a planar array of at least four detector elements 44 receiving a substantially elliptical light source from cylindrical lens 46. Phantom block 47 represents the location of the objective lens means. Horizontal graph 39 characterizes the relative intensity of the interference light source beam 18 on the surface of detectors 36c, 36d.

Cylindrical lens 46 represents an objective lens means 47 responsive to the substantially circular interference light source for forming a substantially elliptical interference light source pattern shown as pattern 22 in FIG. 2 on the planar array of detector elements 44.

Figure 5:
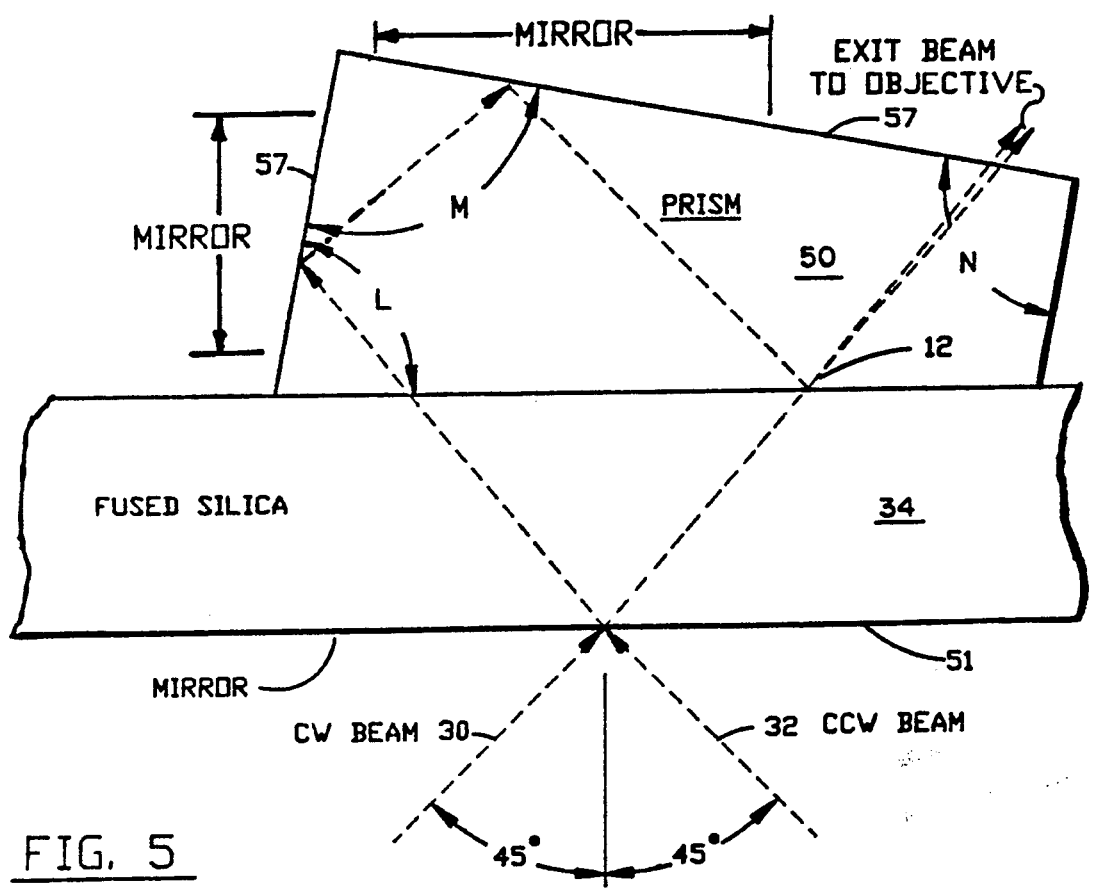
FIG. 5 is a sectional view of the prism and mirror showing a typical ray tracing of the CW and CCW beams from entrance to exit as an interference light source.

FIG. 2 shows circular images 24 and 26, and eliptical image 22, each of which are meant to represent the interference light patterns that would appear on an image plane, such as a sheet of paper, if inserted at that point. The CW and CCW beams are combined to form an interference light source characterized as ray 18a, 18b and 18c. Prism 50 has a receiving face 52 positioned to receive the extracted CW and CCW beams from the ring laser gyroscope cavity. Prism face 54 functions as a transmitting face. The prism is characterized to internally combine the extracted CW and CCW beams 30, 32 to provide the interference light source at 12, as shown in FIG. 5 as a pair of rays exiting to the BEAM OBJECTIVE.

FIG. 2 shows that the planar array of detector elements 44 typically comprises at least four detector diodes 36a, 36b, 36c, 36d. The diodes 36c, 36d represent a first pair of adjacent elements that are positioned to be relatively normal to the interference light source characterized by ray 18c. Diodes 36a and 36b represent a second pair of adjacent elements that are co-planar with the first pair of adjacent elements.

Cylindrical lens 46 represents a particular embodiment of the objective lens means that is responsive to the substantially circular interference light source 18 for forming a substantially elliptical interference light source pattern on the planar array of detector elements 44. The cylindrical lens 46 shown is positioned to receive the substantially circular interference light source, characterized by ray 18b, on its curved surface 45 from a means for combining the CW and CCW beams. The cylindrical lens forms the interference light source 18b into a substantially elliptical pattern 18c on the planar array of detector elements. The detector is positioned so that the elliptical pattern is incident only on the first pair of adjacent detector elements 36c, 36d, as shown in FIG. 8.

FIG. 3 shows the cylindrical lens 46 having a curved surface 45. The curved surface 45 has a radius of curvature R measured from a cylindrical axis 41. The radius R is in a plane normal to the cylindrical axis. The flat surface 43 is parallel to the cylindrical axis 41 and is normal to the systems principal axis characterized by ray 18.

FIG. 5 provides a detail characterization of a typical prism 50 in section. Prism 50 functions as a means for combining the CW and the CCW beams 30, 32 to form an interference pattern light source at 12.

Figure 6:
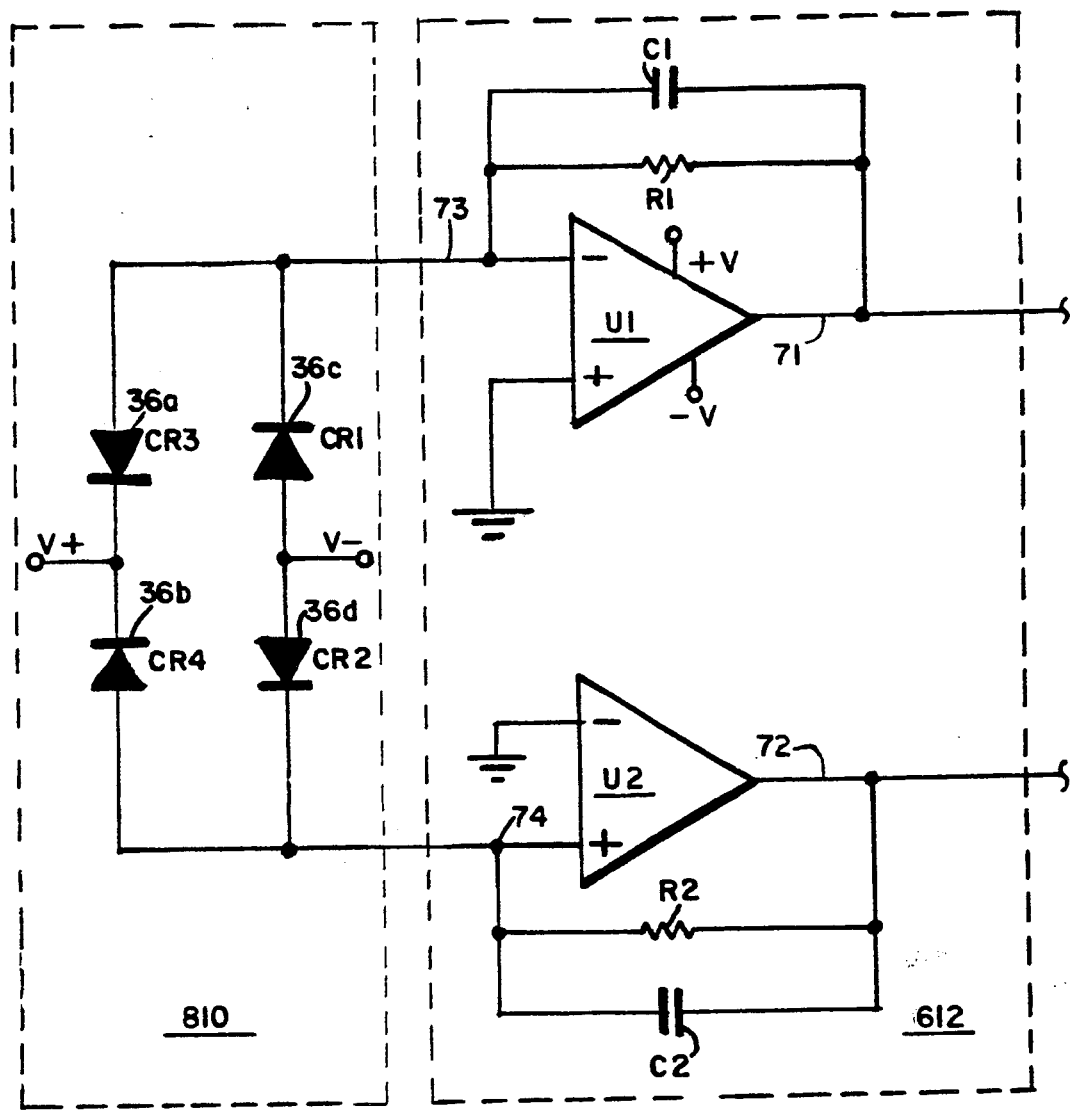
FIG. 6 is a schematic of a typical detector bias and preamplifier circuit.

FIG. 6 characterizes a typical bias and preamplification means for conditioning each of the detectors in the array to be independently responsive to gamma-radiation-induced photocurrents and for combining these photocurrents in opposition to achieve a net cancellation of radiation-induced signals and for conditioning each of diodes 36c and 36d of FIG. 2 to be independently responsive to incident light intensity from the substantially elliptical interference light source. The amplification means is characterized to provide a detector output signal for detectors 36c, 36d in response to the incident light intensity penetrating a predetermined threshold. The phase relationship between the detector output signals and the repetition rate of the detector output signals characterize the rotational polarity and rotational rate of the ring laser gyroscope body on its input axis.

FIG. 7, depicts partially transmissive mirror 34. This mirror represents a more detailed characterization of a means for extracting a component of each of the CW and CCW light beams 30, 32 from the cavity (not shown). The mirror 34 comprises at least one partially transmissive mirror at the intersection of rays 30 and 32, as shown, and is positioned to receive the CW and CCW propagating light beams 30, 32 from the resonant cavity. The mirror is characterized to permit transmission of a predetermined percentage of the intensity of each respective beam to the combining prism 50. Typical mirrors transmit less than 2 percent of received incident light.

The planar array of four detector elements are typically diffused as a planar array in a silicon wafer 44. Metallized contacts (not shown) to the diode are formed on the wafer surface. FIGS. 7 and 7a show leads 87a and 87b connecting these metallized contacts to pins 40. External connections are then made from leads 40 to a bias and amplification means such as that characterized by phantom block 612 of FIGS. 6 and 9.

FIG. 6 shows the bias and amplification means for conditioning the first and second detectors in the array CR1, CR2, to be independently responsive to the elliptical interference light source incident light intensity. The detectors in the array are typically back biased PIN diodes 36a, 36b, 36c, 36d. A bias means for biasing the pin diode, such as voltage sources $V^+$, $V^-$ is shown. Each of PIN diodes CR3, 36c; CR4, 36d are positioned to be responsive to the elliptical interference light source 18c. Phantom block 612 of FIG. 6 shows a typical detector amplifier circuit.

The design process begins with a scale drawing of the lens on coordinate paper. It can be done by hand since the model structure is simple. Three typical rays are selected. The first ray is at the periphery, the second at the opposite periphery, and the last on the principal axis of the beam. Using the index of refraction of the lens, the angle of the beam between the rays are calculated as they enter the lens, pass through the lens and exit the lens. The rays are drawn as they pass through the system to their point of convergence. This point locates the focal plane of the detectors.

Knowing the width of the lens, you measure the distance to the focal plane and that determines the distance from the center of the lens to the detector—the ideal distance.

THE DETECTORS AND PREAMPLIFIERS

The detector and preamplifier circuit shown in FIG. 6 is designed to provide an analog signal of a sinusoidal form when the laser gyro is rotated. This signal is available at the output of preamplifier U1. A second signal of the same period and amplitude but delayed in phase by $\pi/2$ radians is also provided as the output from preamplifier U2. The sinusoidally-varying signal amplitude is generated by the relative total optical power incident on the illuminated detector segments, which are diodes CR3, 36c and CR4, 36d of FIG. 6. These diodes are PIN diode optical detectors.

In this invention, the detector and preamplifier circuit assembly is designed to preserve the signal information in the presence of a high-intensity gamma-radiation environment. In PIN diode optical detectors, gamma radiation produces an electrical current proportional to the rate of absorption (dose rate) of gamma rays by the detector according to the equation:

$$i = k * \dot{\gamma}$$

where i is the radiation photocurrent in amperes, $\dot{\gamma}$ is the dose rate in rads/sec, and k is a constant which depends on the volume of the detector and the material of which it is made. PIN diodes for optical detection are commonly made of Silicon, but for the purposes of this invention, Gallium Arsenide is a better material if the laser gyro produces light at the Helium-Neon laser wavelength of 632.8 nanometers, which is typical for laser gyros. Gallium Arsenide is a more efficient optical material at this wavelength, so that the detectors can have thinner active layers, resulting in a lower radiation photocurrent.

In the schematic of FIG. 6, both the illuminated PIN diode segments (CR3 and CR4) and the non-illuminated segments (CR1 and CR2) produce radiation photocurrents. Since diodes CR3 and CR1 are connected in opposition, and since diodes CR4 and CR2 are also connected in opposition, the radiation photocurrents from each of these diode pairs are of opposite sign and approximately equal magnitude at the inverting inputs of their respective preamplifiers (amplifier U1 for CR3 and CR1, and amplifier U2 for CR4 and CR2). The radiation photocurrents thus approximately cancel. In addition to these radiation photocurrents, an optically-induced photocurrent proportional to the light intensity of the laser gyro interference pattern is produced in each of diodes CR3 and CR4. These currents are of the form $$i = RP \, \text{SIN}(a\theta + \phi)$$

where i is the current in amperes, R is the responsivity of the PIN diode in amperes/Watt, $\theta$ is the angle of rotation of the lasergyro body from some initial reference point, a is a scaling constant and $\phi$ is an arbitrary phase constant, (See F. Aronowitz, "The Laser Gyro" in *Laser Applications*, ed. M. Ross, Publ. by Academic Press, N.Y., N.Y., 1971, pp. 139-140.) and P is the integrated peak optical power incident on the detector. These currents are input also to the inverting inputs of preamplifiers U1 and U2, and have no equivalents in diodes CR1 and CR3 since these diodes are not illuminated by the laser gyro, as shown in FIGS. 1, 2, and 8.

The detector array should be a quadrant detector similar to type 45PQU from Applied Solar Energy Corporation of City of Industry, Calif. Each quadrant of the detector should be of equal volume, and should be of the PIN diode type. In some quadrant detectors only five connections are provided, one for each anode and a single cathode common to all quadrants since it is connected to a common detector substrate. However, for the purposes of this invention, the anodes and cathodes of all PIN diode detector segments should be separately connected to leads available on the detector package.

The preamplifiers should be radiation-resistant operational amplifiers such as type 3511 available from Harris Corp., Melbourne, Fla. Each preamplifier has a feedback resistor (R1 and R2) connected to provide gain and a band-limiting capacitor (C1 and C2). The values of R1 and R2 are selected to provide the required gain based on the open-loop gain of the preamplifiers and the signal current output from the PIN diodes. Resistance values of approximately 100 Kohms would be typical values. The values of capacitors C1 and C2 would be selected to set an upper bound on the signal frequencies output from the preamplifiers, and would be dependent on the gain-bandwidth product of the amplifiers selected as well as the application for which the laser gyro is intended, since this governs the maximum rate at which rotation must be sensed. If the upper limit signal frequency is f, then the values of C1 and C2 are selected by using the equations $$C1 = \frac{1}{2 \Pi f(R1)} \quad C2 = \frac{1}{2 \Pi f(R2)}.$$

The pin diodes are reverse-biased by voltage sources V+ and V−. These voltage sources typically have magnitudes of 6 Volts dc.

FIG. 9 illustrates a use of the invention in processing signals from a ring laser gyro, the output signals being coupled to a circuit for processing the signals out of pre-amps U1 and U2. This circuit for increasing the resolution of gyro signals is described in copending U.S. application titled "Apparatus for Increasing the Resolution of A Laser Gyroscope", having Ser. No. 457,845, filed Jan. 4, 1983 by Inventor A. K. Dorsman and assigned to the common Assignee.

Phantom block 610 represents the invention detector apparatus coupled to block 910 representing a typical ring laser gyro. Blocks 912, 914 and 810 represent respectively, the PRISM for combining the extracted beams, the cylindrical lens for forming the elliptical light source on DIODE ARRAY 810. The laser gyroscope 910 is of the type commonly employed and known in the art which generates two output signals 920 and 922 from the detector apparatus 610 associated with the gyroscope.

As in the prior art, each of the output lines 924 and 926 has associated with it respective amplifiers 925 and 926 and squaring triggers 927 and 928. The output from squaring trigger 927 is designated as $\phi$ A, and the output from squaring trigger 928 is designated as $\phi$ B. Output signals $\phi$ A and $\phi$ B are connected to inputs to an exclusive OR gate 930. The output from the exclusive OR gate 930 is conducted to the "T" and "Td" inputs of a one-shot multivibrator 931, as well as to an input of a second exclusive OR gate 935.

The output from the squaring trigger 927 is applied to the "T" and "Td" inputs of a second one-shot multivibrator 940, and the "Q1" output of the second one-shot multivibrator 940 is connected to a second input of the exclusive OR gate 935. The one-shot multivibrators 931 and 940 can conveniently be of the type DM8853, sold by National Semiconductor, Inc.

Thus, two outputs are developed, one being the output from the exclusive OR gate 935, on line 942, which, as described below in detail, represents a mode signal indicative of the direction of rotation of the laser gyroscope 11. The other output is developed on the "not Q2" output of the first one-shot multivibrator 931 on line 943, which represents a clock signal which is a multiplied frequency of either the output developed on signal lines 924 and 926.

THE LENS AND PRISM

Cylindrical lenses typically have a radius of curvature from 0.5 to 3.0 inches. The index of refraction of optical glass is typically 1.3 to 1.7. In this embodiment, the lens is made of fused silica which has an index of refraction of 1.457. Fused silica is produced synthetically by the vapor phase hydrolysis of silicon halide. Synthetic fused silica is a vitreous non-crystalline highly transparent glass. Fused silica was selected for its resistance to degradation when exposed to high levels of radiation. Fused silica is a radiation resistant glass and it is necessary if radiation hardness is the object of the invention.

The prism is also fused silica. Fused silica is a synthetic commercial material from Dynasil ® Corporation of America of Cooper Road, Berlin, N.J. Silica is like silicon dioxide but it takes on a different structure when it is fused Silica due to the way it is melted and formed.

Zerodur ® would be preferable dimensionally but darkens too much for a given amount of radiation. An engineering tradeoff is involved.

The subject invention can be designed to position all light from the objective onto the detectors, thus increasing the signal to noise ratio. This feature of the invention simplifies the design of the diode array.

LENS DESIGN PROCEDURE

Figure 4:
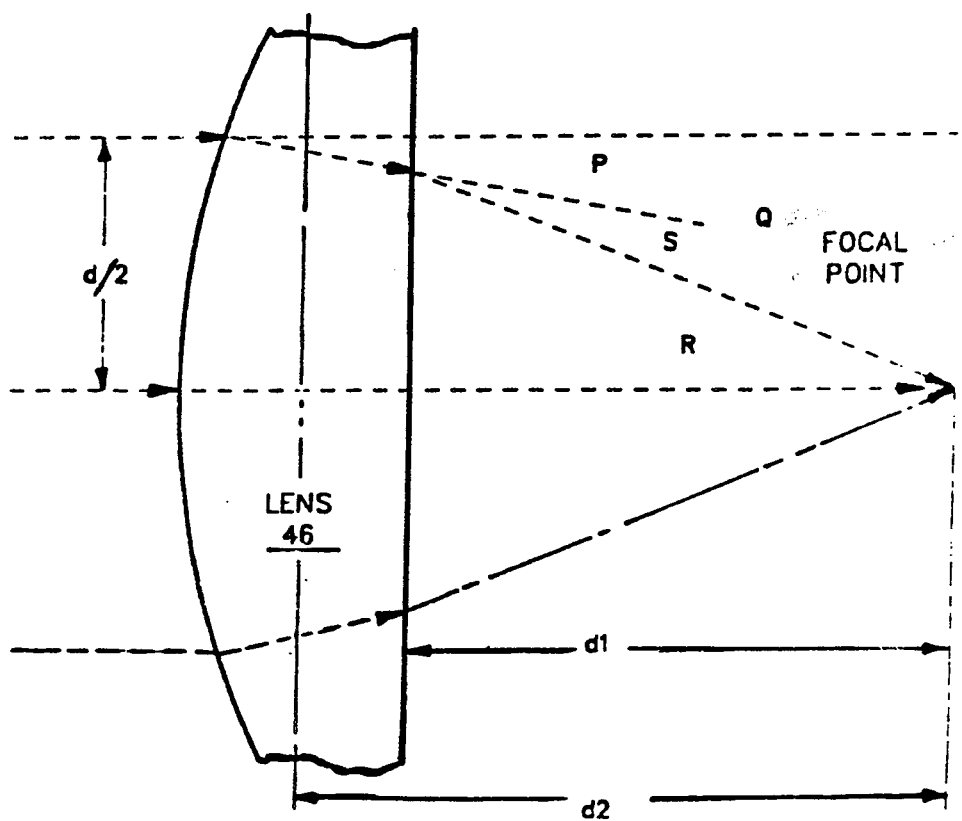
FIG. 4 is a sectional view of the lens showing its relationship to the rays traced in FIG. 3 and to a focal plane.

The lens design procedure consists of two steps: referring to FIG. 4, first, select the lens width W and use this to determine the focal length d2; second, perform a ray trace to find angle S and use beam radius d//2 with angle S to determine the approximate distance d1 from the flat surface of the lens to the focal plane, where the detector will (ideally) be located. For the purpose of clarity, the symbol "*" will be used to denote multiplication and the symbol "/" to denote division.

FOCAL LENGTH COMPUTATION

Referring to FIG. 4, the focal length computation procedure begins by acknowledging that the focal length of a cylindrical lens is approximately:

$$f = d2 = R/(n-1) \tag{1}$$

Equation 1 is obtained from conventional optics design principles such as those relating thin lens design based on spherical surfaces such as the "lensmaker's" equation 5.16 on page 107 of a text "OPTICS" by Eugene Hecht et al in 1974 by the Addison Wesley Publishing Company of Menlo Park, Calif. as:

$$1/f = (n-1)(1/R1 - 1/R2) \tag{2}$$

R1 is the radius of the first surface and R2 is the radius of the second surface of a typical thin lens, not shown in the accompanying figures. Since the second surface 43 in FIG. 3 is flat, R2= and the 1/R2 term goes to zero. R1 becomes the radius R of the front surface 45 of the lens. Solving equation 2 for $f = d2 = R/(n-1)$.

Referring to FIG. 4, the lens width "W" is chosen to be 2*d, where d/2 is one half of the diameter of the beam 18b incident on the lens. W represents the chord of a cylinder of radius R, with the curved periphery of the circle representing the curved surface 45 of the lens and the chord of length W representing the flat surface 43 of the lens. Choosing W=2*d allows for tolerance in the positioning of the lens with respect to the beam during assembly.

Referring to FIG. 4, the half-angle of curvature U of the lens' curved surface is limited to be not greater than approximately 40 degrees in order for the "lensmaker's" equation to apply. Angle U should be as large as possible, subject to this limitation, so that the focal length is small, hence allowing the detectors to be positioned close to the lens' flat surface for compactness of the invention. Selecting U to be 40 degrees, the relation:

$$W/2 = R*SIN(U) = R*SIN(40°) \tag{3}$$

is obtained using only simple trigonometry. Substituting W=2*&d and evaluating the SIN (40°) term, equation:

$$d = 0.64*R \tag{4}$$

is obtained. Rearranging for R provides equation:

$$R = d/0.64 \tag{5}$$

and this is substituted into equation 1 along with the index of refraction for fused silica, n=1.457, to obtain:

$$f = d2 = R/(n-1) = d/0.64*(1.457-1) = 3.42*d \tag{6}$$

This relationship is approximated by selecting:

$$f = d2 = 3.5*d \tag{7}$$

which relates the focal length of the lens to the diameter of the beam.

RAY TRACE

Referring to FIG. 3, a ray 54 of the periphery of the incident beam is selected and traced through the lens. Due to the symmetry of both the beam and the lens, a ray at the opposite periphery of the beam will trace angles of the same magnitude but will deflect in the opposite direction as it passes through the lens. A third ray 186, drawn along the principal axis of the beam and lens, will not be deflected since it traverses normal to the surface at each air-glass interface. Thus, only a single ray need be traced.

Referring now to FIG. 3, Snell's Law is applied to relate angle P to angle Q as:

$$SIN(P) = n*SIN(Q) \tag{8}$$

where n is the index of refraction of the fused silica lens 46. Recall that as a ray moves from a material having a lower index of refraction, such as air at 1, into a material having a higher index of refraction, the ray 54 is deflected toward the normal 58 to become ray 52 inside the lens. This process is reversed as the ray 53 leaves the lens moving from a higher index of refraction (1.457) to a lower one for air of 1.0. From FIG. 3, it is apparent that:

$$d/2 = R*SIN P \tag{9}$$

where d/2 is the radius of the beam 18C in FIG. 1 measured to the 2σ level of intensity. From equation 2 we obtain equation 10:

$$R = f*(n-1) \tag{10}$$

Substituting the right side of equation 10 for the variable R in equation 8 provides equation 11 below:

$$d/2 = f*(n-1) SIN(P) \tag{11}$$

By subtracting the value in equation 7 for f in equation 11, equations $$d/2 = (n-1) * 3.5 * d * \text{SIN}(P) \quad (12)$$

and $$d = 7*(n-1)*d*\text{SIN}(P) \quad (13)$$

are obtained.

From equation 13, an equation for P is obtained $$P = \text{SIN}^{-1}(d/(7*n-1)*d) \quad (14)$$

or, cancelling d in the right side of equation 14, $$P = \text{SIN}^{-1}(1/(7*n-1)). \quad (15)$$

Substituting for n in equation 15, n=1.457, then $$P = \text{SIN}^{-1}(0.313) = 18.2° \quad (16)$$

From equation 8, the angle Q is:

$$Q = \text{SIN}^{-1}(\text{SIN } P/n) = \text{SIN}^{-1}(0.313/1.457) \quad (17)$$

Therefore, $$Q = 12.4°. \quad (18)$$

Referring to FIG. 3, as ray 52 approaches the rear lens surface 43, it forms angle T with normal ray 59. Ray 52 leaves as ray 53 and forms angle S with normal 59. In accordance with Snell's Law, angles T and S are related by equation 19:

$$n*\text{SIN}(T) = \text{SIN}(S). \quad (19)$$

From the geometric relationships of FIG. 3, equation 20 is apparent:

$$T = P - Q. \quad (20)$$

Substituting the right side of 20 for angle T in equation 19 provides:

$$n*\text{SIN}(P-Q) = \text{SIN}(S) \quad (21)$$

$$S = \text{SIN}^{-1}(n*\text{SIN}(P-Q)) \quad (22)$$

$$S = \text{SIN}^{-1}(1.457*\text{SIN}(18.2° - 12.4°)) \quad (23)$$

$$S = \text{SIN}^{-1}(1.457*\text{SIN}(5.8°)). \quad (24)$$

Therefore, $$S = 8.5°. \quad (25)$$

The flat part of the lens is positioned toward the Focal Plane.

Referring to FIGS. 3 and 4, neglecting the distance between 54 and 59, it can be shown that:

$$d1 = (d/2)/(\tan S). \quad (26)$$

The foregoing procedure has demonstrated the design steps for the invention detector lens system. Parameters calculated included: f, the focal length; R, the lens' radius of curvature; and d1, the distance from the flat surface of the lens to the ideal detector position.

PRISM DESIGN

Referring to FIGS. 5 and 7, the prism angle M is calculated based on the known index of refraction of fused silica, n=1.457, of which the prism is made. A design procedure is illustrated in standard reference works on Ring laser Gyroscopes such as the article by Mr. F. Aronowitz, "The Laser Gyro", in "LASER APPLICATIONS", Ed. M. Ross, published by *Academic Press*, New York, N.Y., 1971, on pages 139 and 140.

In FIG. 5, face 57 is shown having a partial mirror coating that covers the surface region near angle M. These coatings allow the CCW beam 32 to reflect from faces 57 and 54, combining with CW beam 30 at 12 to form the interference light source.

Although the invention method has been disclosed and illustrated in detail, it is to be clearly understood that the same is by way of illustration as an example only and is not to be taken by way of limitation. The spirit and scope of this invention is to be limited only by the terms of the appended claims.

What is claimed is:

1. A ring laser gyroscope detector lens system for mounting on an ring laser gyroscope body subject to operating in a recurrent transient high-intensity gamma-radiation environment, said ring laser gyroscope body having a resonant cavity, said ring laser gyroscope body having CW and CCW counterpropagating light beams propagating in a plane normal to the rate input axis of said ring laser gyroscope, said ring laser gyroscope detector lens system comprising:

a means for extracting a component of each of said CW and a CCW light beams from said cavity and for providing extracted CW and CCW beams;

a means for combining said extracted CW and CCW beams to form a substantially circular interference light source;

a planar array of at least four detector elements, each detector in said planar array of detector elements being subject to said recurrent transient gamma-radiation, said radiation producing respective electrical photo currents in each detector proportional to each detectors' respective rate of absorption, a first and second of said four detector elements being positioned to form a first pair of adjacent detector elements, a third and fourth of said four detector elements being positioned to form a second pair of detector elements and being electrically coupled to produce electrical photo currents of a magnitude and a polarity characterized to substantially cancel the photo-currents produced by said first and second detector elements in response to said recurrent transient gamma-radiation;

an objective lens means responsive to said interference light source for forming a substantially elliptical interference light source pattern on said first and second adjacent detector elements;

bias and amplification means for conditioning said first and second detectors in said array to be independently responsive to said elliptical interference light source incident light intensity, said amplification means being further characterized to provide a first and second detector output signal for said first and second adjacent detector elements in response to said incident light intensity penetrating a predetermined threshold;

whereby, the phase relationship and the repetition rate of said first and second detector output signals characterize the rotational polarity and rotational rate of said ring laser gyroscope body on said input axis; and whereby the output of said first, second, third and fourth detectors produced in response to said recurrent transient gamma-radiation environment substantially cancel each other thereby preserving said detector output signals produced in response to said elliptical interference light source incident light intensity on said first and second detector elements.

2. The ring laser gyroscope detector lens system of claim 1 wherein said means for extracting a component of each of said CW and CCW light beams from said cavity further comprise:
   at least one partially transmissive mirror, said mirror being positioned to receive said CW and CCW propagating light beams from said resonant cavity, said mirror being characterized to permit transmission of a predetermined percentage of the intensity of each respective beam to said means.

3. The ring laser gyroscope detector lens system of claim 1 wherein said means for combining said CW and said CCW beam to form a light source, said CW and CCW beams being combined to form an interference light source further comprises:
   a prism having a receiving face positioned to receive said extracted CW and CCW beams, and
   a transmitting face, said prism being characterized to internally combine sale extracted CW and CCW beams to provide said interference light source.

4. The ring laser gyroscope detector lens system of claim 2 wherein said means for combining said CW and said CCW beam to form a light source, said CW and CCW beams being combined to form an interference light source further comprises:
   a prism having a receiving face positioned to receive said extracted CW and CCW beams, and
   a transmitting face, said prism being characterized to internally combine said extracted CW and CCW beams to provide said interference light source.

5. The ring laser gyroscope detector lens system of claim 4 wherein said partially transmissive mirror and said prism are formed from material having identical indices of refraction.

6. The ring laser gyroscope detector lens system of claim 1 wherein said planar array of at least four detector elements are arrayed to form a first and second row, said first row having said first and second detector elements and a second row having said third and fourth detector elements, said first and third detector elements forming a first column and said second and fourth detector elements forming a second column; each detector element having substantially the same area; said planar array being positioned to be relatively normal to said interference light source.

7. The ring laser gyroscope detector lens system of claim 1 wherein said objective lens means responsive to said interference light source for forming an interference light source pattern on said planar array of detector elements further comprises:
   a cylindrical lens,
      said cylindrical lens being positioned to receive said interference light source on its curved surface from said means for combining said CW and CCW beams,
      said cylindrical lens forming said interference light source into a relatively elliptical pattern on said planar array of detector elements.

8. The ring laser gyroscope detector lens system of claim 5 wherein said objective lens means responsive to said interference light source for forming an interference light source pattern on said planar array of detector elements further comprises:
   a cylindrical lens,
      said cylindrical lens being positioned to receive said interference light source on its curved surface from said means for combining said CW and CCW beams,
      said cylindrical lens forming said interference light source into a relatively elliptical pattern on said planar array of detector elements.

9. The ring laser gyroscope detector lens system of claim 7 wherein said cylindrical lens responsive to said interference light source for forming a relatively elliptical interference light source pattern on said planar array of at least four detector elements further comprises:
   a curved surface,
      said curved surface having a radius of curvature measured from a cylindrical axis and in a plane normal to said cylindrical axis,
   a flat surface, and
   a principal axis normal to said flat surface.

10. The ring laser gyroscope detector lens system of claim 8 wherein said cylindrical lens responsive to said interference light source for forming a relatively elliptical interference light source pattern on said planar array of detector elements further comprises:
   a curved surface,
      said curved surface having a radius of curvature measured from a cylindrical axis and in a plane normal to said cylindrical axis,
   a flat surface, and
   a principal axis normal to said flat surface.

11. The ring laser gyroscope detector lens system of claim 1 wherein said prism is further characterized to have at least one mirrored surface for enhancing the internal reflectivity of said prism, said mirrored surface being positioned to avoid interference with said exiting interference light source.

12. The ring laser gyroscope detector lens system of claim 6 wherein each of said four detector elements further comprises:
   a gallium arsenide detector.

13. The ring laser gyroscope detector lens system of claim 3 wherein said prism is formed from fused silica.

* * * * *